United States Patent [19]

Epstein et al.

[11] 4,404,317

[45] Sep. 13, 1983

[54] POLYAMIDE BLENDS

[75] Inventors: Bennett N. Epstein, Wilmington, Del.; Rolando U. Pagilagan, Parkersburg, W. Va.

[73] Assignee: E. I. Du Pont de Nemours & Co., Wilmington, Del.

[21] Appl. No.: 427,479

[22] Filed: Sep. 29, 1982

Related U.S. Application Data

[63] Continuation of Ser. No. 281,907, Jul. 9, 1981, abandoned.

[51] Int. Cl.³ .............................................. C08L 77/00
[52] U.S. Cl. ..................................... 524/538; 525/432
[58] Field of Search .......................... 525/432; 524/538

[56] References Cited

U.S. PATENT DOCUMENTS

| | | | |
|---|---|---|---|
| 3,597,400 | 8/1971 | Kashiro et al. | 528/338 |
| 3,642,941 | 2/1972 | Schneider et al. | 525/432 |
| 3,646,156 | 2/1972 | Schneider et al. | 525/432 |
| 3,875,129 | 4/1975 | Herwig et al. | 525/432 |

*Primary Examiner*—John C. Bleutge
*Assistant Examiner*—Ana L. Carrillo

[57] ABSTRACT

Particular amorphous thermoplastic polyamide copolymers can be combined with semicrystalline thermoplastic polyamides to produce molding resins having a wide variety of applications depending on the relative amounts of the amorphous copolymer and the crystallizable polyamide present.

14 Claims, No Drawings

POLYAMIDE BLENDS

This is a continuation of application Ser. No. 281,907, filed July 9, 1981 now abandoned.

FIELD OF THE INVENTION

This invention relates to polyamide blends, and more particularly to blends of at least one amorphous copolyamide and at least one semicrystalline polyamide.

BACKGROUND OF THE INVENTION

The properties of thermoplastic semicrystalline polyamide molding resins may be altered by addition of various additives to the resins, such as fillers or reinforcing agents, flame retardants, stabilizers and the like. On the other hand, certain amorphous copolyamides can be molded to produce transparent molded articles.

SUMMARY OF THE INVENTION

In this invention, it has been discovered that particular amorphous thermoplastic copolyamides can be combined with semicrystalline thermoplastic polyamides to produce molding blends having a variety of applications depending on the relative amounts of the amorphous polyamide and the semicrystalline polyamide present.

In its broadest aspect, this invention is a blend of thermoplastic polyamide molding resins comprising
(a) about 5–98 percent by weight of a thermoplastic semicrystalline polyamide of film-forming molecular weight, and complementally,
(b) about 95–2 percent by weight of a thermoplastic amorphous copolyamide consisting essentially of
  (i) 40–98 mole percent units of isophthalic acid based on total acids present,
  (ii) 2–60 mole percent units of terephthalic acid based on total acids present,
  (iii) 50–98 mole percent units of hexamethylene diamine based on total amines present; and
  (iv) 2–50 mole percent units, based on total amines present, of at least one aliphatic diamine containing between 8 and 20 carbon atoms and containing at least one cyclohexane moiety,
wherein in the amorphous copolyamide the mole percent phthalic acids present totals 100 percent and the mole percent diamines present totals 100 percent, and wherein up to 40 weight percent of the amorphous copolyamide may consist of units of a lactam, or an $\omega$-aminoacid of 4–12 carbon atoms, or units derived from a 4–12 carbon atoms aliphatic dicarboxylic acid and a 2–12 carbon atom aliphatic diamine.

In one preferred aspect of the invention, the semicrystalline polyamide will be present in an amount of about 5 to about 40 percent to impart solvent resistance to transparent articles molded from the blend.

In another preferred aspect of the invention, the semicrystalline polyamide will comprise about 40 to about 98 percent and the amorphous copolyamide will be present in an amount of between about 2 and 60 percent to improve resistance to attack by zinc chloride, and reduce debilitating effects of moisture on articles molded from the semicrystalline polyamides.

The term "thermoplastic semicrystalline polyamide" means that the polyamide has a distinct melting point with a measurable heat of fusion as described below. Amorphous copolyamides will generally have no distinct melting point nor measurable heat of fusion although with very slow cooling from the melt or sufficient annealing some crystallinity may develop. The heat of fusion is conveniently determined by use of a differential scanning calorimeter (DSC). A suitable calorimeter is The Du Pont Company's 990 thermal analyzer Part Number 990000 with cell base II, Part Number 990315, and DSC cell, Part Number 900600. With this instrument, heat of fusion can be measured at a heating rate of 20° C. per minute. The sample is alternately heated to a temperature above the anticipated melting point and cooled rapidly by cooling the sample jacket with liquid nitrogen. The heat of fusion is determined on any heating cycle after the first and should be a constant value, within experimental error. Amorphous polyamides are defined herein as having a heat of fusion, by this method, of less than 1 cal/gm. Semicrystalline polyamides are defined herein as having a heat of fusion of more than 1 cal/gm. For reference, semicrystalline 66 nylon polyamide with a molecular weight of about 17,000 has a heat of fusion of about 16 cal/gm.

DESCRIPTION OF THE INVENTION

The semicrystalline polyamides are well-known in the art. They have molecular weights over 10,000 and can be produced by condensation of equimolar amounts of a saturated aliphatic dicarboxylic acid containing from 4–12 carbon atoms with an aliphatic diamine containing 2–12 carbon atoms, in which the diamine can be employed, if desired, to provide an excess of amine end groups over carboxy end groups in the polyamide. Vice versa, the diacid can be used to provide an excess of acid groups. Equally well, these polyamides may be made from acid-forming and amine-forming derivatives of said acids and amines such as esters, acid chlorides, amine salts, etc. Representative aliphatic dicarboxylic acids used to make the polyamides include adipic acid, pimelic acid, azelaic acid, suberic acid, sebacic acid, and dodecanedioic acid, while representative aliphatic diamines include hexamethylenediamine and octamethylenediamine. In addition, these polyamides can also be prepared from self-condensation of a lactam. Examples of polyamides include polyhexamethylene adipamide (66 nylon), polyhexamethylene azelamide (69 nylon), polyhexamethylene sebacamide (610 nylon), and polyhexamethylene dodecanoamide (612 nylon), poly-bis-(p-aminocyclohexyl)methane dodecanoamide, or polyamides produced by ring opening of lactams; i.e., polycaprolactam (6 nylon), and polylauryl lactam. It is also possible to use polyamides prepared by the polymerization of at least two of the amines or acids used to prepare the above polymers, as for example, a polymer made of adipic acid, and sebacic acid and hexamethylene diamine. Blends of polyamides, such as a mixture of 66 nylon and 6 nylon are also included as are copolymer such as nylon 66/6. Preferably the condensation polyamide employed herein is polyhexamethylene adipamide (66 nylon), or a blend of polyhexamethylene adipamide (66 nylon) and polycaprolactam (6 nylon).

The amorphous copolyamide preferably comprises 60–90 mole percent units of isophthalic acid, 10–40 mole percent units of terephthalic acid, 80–98 mole percent units of hexamethylene diamine, and 2–20 mole percent units of at least one aliphatic diamine containing between 8 and 20 carbon atoms and containing at least one cyclohexane moiety. The amorphous copolyamides exhibit melt viscosities at 280° C. of less than 30,000 poise, and preferably less than 20,000 poise, measured at a shear stress of $10^5$ dynes/cm$^2$. The amorphous copolyamides can be prepared by known polymer condensation methods in the composition ratios mentioned above. In order to form high polymers the total moles of the acids employed should equal the total moles of the diamines employed.

Representative aliphatic diamines containing 8–20 carbon atoms and at least one cyclohexane moiety or nucleus include 1-amino-3-aminomethyl-3,5,5-trimethylcyclohexane, i.e.,

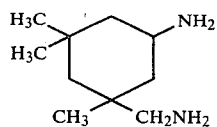

1,4-bis(aminomethyl)cyclohexane, i.e.,

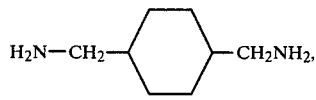

bis(p-aminocyclohexyl)methane, i.e.,

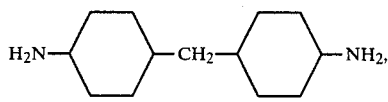

and the like.

As normally made, the 1-amino-3-aminomethyl-3,5,5-trimethylcyclohexane and 1,4-bis(aminomethyl)cyclohexane are mixtures of the cis and trans isomers. Any isomer ratio may be used in this invention.

Bis(p-aminocyclohexyl)methane (PACM hereinafter) which can be used as one of the diamine components in this invention is usually a mixture of three stereoisomers. In this invention any ratio of the three may be used.

The polymerization to prepare the amorphous copolyamide may be performed in accordance with known polymerization techniques, such as melt polymerization, solution polymerization and interfacial polymerization techniques, but it is preferred to conduct the polymerization in accordance with melt polymerization procedures. This procedure produces polyamides having high molecular weights. In melt polymerization, the 8–20 carbon cycloaliphatic diamine, hexamethylene diamine, terephthalic acid and isophthalic acid are mixed in such amounts that the ratio of the diamine components and the dicarboxylic acid components will be substantially equimolar and that the composition of these monomers will satisfy the mole percents recited above. Up to 40 percent by weight of optional monomers may be included as desired, such as caprolactam, laurolactam, ω-aminocaproic acid, ω-aminoundecanoic acid, or a salt of 4–12 carbon alkylene dicarboxylic acids and 2–12 carbon alkylene diamines. The components are heated at temperatures higher than the melting point of the resulting polyamide but lower than the degradation temperature thereof. Because of the volatility of the hexamethylene diamine, a slight excess is usually employed in the mix. The heating temperature is in the range of 170° to 300° C. The pressure can be in the range of from atmospheric pressure to 300 psig.

The method of addition of starting monomers is not critical. For example, salts of combination of the diamines and acids can be made and mixed. It is also possible to disperse a mixture of the diamines in water, add a prescribed amount of a mixture of acids to the dispersion at an elevated temperature to form a solution of a mixture of nylon salts, and subject the solution to the polymerization.

If desired, a monovalent amine or, preferably, an organic acid, may be added as viscosity adjuster to a mixture of starting salts or an aqueous solution thereof.

The amounts of the semicrystalline polyamide and the amorphous copolyamide present in the blend of this invention will depend on the purpose for which the blend is to be employed. For example, when transparency of molded articles is desired, the amorphous copolyamide will comprise the predominant component, and preferably will comprise at least 60 percent by weight of the blend. If the blend is to be annealed, it has been found that the amount of the amorphous copolyamide should be at least 70 percent in order to ensure good transparency. Furthermore, some semicrystalline polyamides such as 612 nylon, are incompatible with the amorphous copolyamides employed herein, and transparent molded articles are not obtained when such semicrystalline polyamides are used. However, such nontransparency does not affect the usefulness of the blend in other respects.

When the amorphous copolyamide is present in an amount between about 2–60 percent by weight, resultant molded articles have better resistance to the effect of moisture than semicrystalline polyamides alone, and when the amorphous polyamide is present in an amount of at least 20 percent by weight, resultant molded articles have good resistance to the effect of aqueous zinc chloride. This latter property is especially important when the blend is employed in automotive components such as tubing, cable jackets or molded parts. Such components need to be resistant to the corrosive effects of chloride salts used to de-ice roadways and chloride salts from sea mists. Such salts may either contain zinc chloride or form zinc chloride when in contact with zinc automotive components.

The blends of this invention can be prepared by mixing the semicrystalline polyamide with the amorphous copolyamide. Of course more than one of each such polyamides and copolyamides may be present. Preferably the components are physically mixed in small particle form, and are then intimately melt blended in the melt through a suitable melt extruder, molding machine, or any other equipment for melt blending. During mixing some transamidation may occur, the extent of such depending on factors such as temperature, residence time, and presence of substances that can catalyze the reaction.

The blends may contain conventional fillers or reinforcing agents, such as glass, mica or the like, dyes, UV or heat stabilizers, flame-retardants, antioxidants, or plasticizers.

The blends can be molded into useful articles having good solvent resistance, good dimensional stability, and good retention of physical properties under moist or wet conditions. These qualities make the blends useful for producing shaped bodies, such as automobile fenders, bumpers and the like.

PREPARATION OF AMORPHOUS COPOLYAMIDES

I. General

The amorphous copolyamides were prepared in an autoclave by reacting the aqueous salt solutions of the respective resins at a temperature normally below 300° C. and a pressure normally below 300 psig for a suitable time, usually about two hours. When most of the water was evaporated, the pressure was gradually bled to atmospheric and the reaction was allowed to continue under vacuum until the desired molecular weight was attained. If lower molecular weight is desired, the final stage of the reaction can be carried out at atmospheric conditions rather than under vacuum.

II. Preparation of Copolyamide I—Preparation of Tetrapolymer of 6I/6T/PACM I/PACM T (66.8/28.6/3.2/1.4 Salt Ratio)

Preparation A 6I refers to hexamethylene diamine (HMD) and isophthalic acid (I) units,
6T refers to HMD and terephthalic acid (T) units,
PACM I refers to units of PACM and I, and
PACM T refers to units of PACM and T.
PACM means bis(p-aminocyclohexyl)methane To 140 lb of water were added 48.8 lb of aqueous hexamethylene diamine (HMD) with a concentration of 82.03 percent HMD and 2.6 lb of bis(p-aminocyclohexyl)methane (PACM) containing over 59 percent cis, trans isomer. The mixture was heated and 41.2 lb of isophthalic and 17.7 lb of terephthalic acids were added. The pH of the solution was adjusted to 8.62 with small amounts of HMD. To the salt solution were added 49 grams of sodium phenylphosphinate heat stabilizer, 97 grams of 4,4'-butylidenebis(6-tert-butyl-m-cresol) antioxidant, 20 ml of a 10 percent emulsion of polydimethylsiloxane as antifoaming agent, and 14 ml of glacial acetic acid for molecular weight control. The temperature of the solution was maintained at 70°–80° C.

The salt mixture was then charged into an autoclave. The mixture was heated to 175° C. and subjected to a pressure of 180 psig. The water was slowly bled off while maintaining the pressure at 180 psig until the solution was concentrated enough and the temperature of the batch reached 226° C. The pressure was then slowly reduced to atmospheric and vacuum was applied. The batch temperature was then allowed to rise to about 270° C. When the desired molecular weight was attained, the autoclave was pressured with nitrogen gas and the polymer was extruded into cylindrical strand, quenched in water, and cut into pellets.

In terms of individual acids and diamines employed, the copolyamide contained 70 percent isophthalic acid and 30 percent terephthalic acid, for a total of 100 percent acid; and 96.5 percent HMD, and 3.5 percent PACM, for a total of 100 percent diamine.

Preparation B

To 9958 lb of water were added 2185 lb aqueous HMD with a concentration of 80 percent HMD and 115 lb of PACM containing over 59 percent cis, trans isomer. The mixture was heated to 60° C. and 1815 lb of isophthalic and 778 lb of terephthalic acids were added. The pH of the salt solution was then adjusted to 8.6±0.1 with HMD. After pH adjustment, 4.68 lb of sodium phenylphosphinate was added.

6000 lb of the salt solution (1800 lb of salt) was charged into the pre-evaporator where the solution was concentrated to about 80 percent at 20 psig pressure and temperatures of 120°–140° C. The concentrated solution was then transferred to the autoclave and 7.2 lb of glacial acetic acid and polyethylene oxide were added. The salt solution was then heated and the pressure allowed to rise to 250 psig and additional water was slowly bled off while maintaining the pressure. When the batch temperature reached about 280° C., the pressure was slowly reduced to atmospheric within 90 minutes followed by about 45-minute hold at atmospheric pressure. The polymer was then extruded from the autoclave by means of nitrogen pressure, quenched, and cut into pellets. The polymer was then surface coated with 0.09 weight percent of aluminum distearate lubricant. The inherent viscosity of the polymer was between 0.7 and 0.8.

III. Preparation of Copolyamide II—Preparation of 6I/6T/PACM I/PACM T (63.5/27.2/6.5/2.8)

This polymer was prepared as in Preparation A.
To 140 lb of water were added 46.5 lb HMD (concentration 82.03 percent) and 5.25 lb of the same bis(p-aminocyclohexyl)methane used in Preparation A. The mixture was heated and 41.2 lb isophthalic and 17.7 lb terephthalic acids were added. The pH was then adjusted to 8.60 with small amounts of HMD. To the salt solution were added 49 grams of sodium phenylphosphinate, 97 grams of 4,4'-butylidenebis(6-tert-butyl-m-cresol), 20 ml of a 10 percent emulsion of polydimethylsiloxane, and 14 ml of glacial acetic acid.

IV. Preparation of Copolyamide III—Preparation of 6I/6T/PACM I/PACM T (57.6/24.7/12.4/5.3)

The salt charge was prepared as above using 140 lb water, 44.2 lb of hexamethylene diamine (concentration 81.45 percent), and 10.5 lb of the same bis(p-aminocyclohexyl)methane used in Preparation A. The diamines were reacted with 41.2 lb isophthalic acid and 17.7 lb terephthalic acids and pH adjusted to 8.50. To the salt solution were added 49 grams of sodium phenylphosphinate, 97 grams of 4,4'-butylidenebis(6-tert-butyl-m-cresol), 20 ml of a 10 percent emulsion of polydimethylsiloxane, and 14 ml of glacial acetic acid.

EXAMPLES

Test Procedures

Tensile strength and elongation were determined as described in ASTM D-638. The samples were tested dry-as-molded (DAM) and after conditioning to 50 percent relative humidity (RH) equilibrium moisture by boiling in potassium acetate solution (1.25 lb potassium acetate per lb water).

Flexural modulus was determined as described in ASTM D-790.

Notched Izod was determined as described in D-256.

Heat Deflection Temperature (HDT) was determined by annealing the polymer at 100° C. for 30 minutes prior to testing of Blends 1–5 and 200° C. for 30 minutes prior to testing of Blends 8 and 9, and tested according to ASTM D-648.

Relative Viscosity (RV) was determined by ASTM D-789.

Inherent Viscosity (IV) was determined at 25° C. in m-cresol in accordance with ASTM D-2857.

Zinc chloride resistance was tested as follows:

Five molded specimens of the resin having a rectangular form and a length of 5 inches, a width of one-half inch and a thickness of one-eighth inch were bent around the surface of a mandrel having a diameter of one inch and secured in such position. Each bent specimen was immersed in a 50 percent aqueous zinc chloride solution and inspected periodically for formation of stress-cracks.

Mold shrinkage was determined on molded 5"×½"×⅛" specimens. The specimens were placed in 50 percent RH at room temperature and the length of the specimens measured after 48 hours. The shrinkage is calculated from the dimension of the mold cavity in mils/inch.

Preparation of Blends

Blends 1–7 of the examples below were prepared using either a 28 mm or 53 mm Werner & Pfleiderer twin-screw extruder. Blends 8 and 9 were made using a single screw extruder. The crystalline nylon and copolyamides were mixed in their proper proportions in a suitable vessel such as a drum or bag. The nylon mixture is then melt blended in the extruder at about 270°–300° C. Any temperatures above the melting point of the crystalline polyamide may be used but other considerations such as rate, melt viscosity, and possible degradation of the polymer at high temperatures are some of the factors to be considered in the selection of processing temperature.

The material exiting the die is quenched in water, cut into pellets, and sparged with nitrogen until cold to remove moisture.

The dried material is molded into test specimens using a 5- or 6-oz. screw injection molding machine.

Percents are by weight unless otherwise indicated.

The Blends referred to in the Tables below are blends of this invention. The blends are composed of the following ingredients.

Blend 1

80 percent copolyamide I (Preparation A) having an IV of 0.93, and 20 percent 66 nylon having a relative viscosity of about 52.

Blend 2

80 percent copolyamide II having an IV of 0.87, and 20 percent of the 66 nylon used above.

Blend 3

80 percent copolyamide I (Preparation A) having an IV of 0.86, and 20 percent 6 nylon having a relative viscosity of about 80.

Blend 4

85 percent copolyamide I (Preparation A) having an IV of 0.87, and 15 percent nylon 612 having an inherent viscosity of about 1.17.

Blend 5

80 percent copolyamide III having an IV of 0.94, and
20 percent of the 66 nylon used in Blend 1.

Properties of molded articles of Blends 1–5 are as follows:

TABLE 1

| Blend | Tensile Strength in Kpsi | Percent Elong | Flex Modulus Kpsi | Notched Izod ft-lb/in | Annealed HDT (°C.) 66 psi | Annealed HDT (°C.) 264 psi |
|---|---|---|---|---|---|---|
| 1 | 14.3 | 75 | 395 | 1.32 | 116 | 108 |
| 2 | 14.6 | 111 | 404 | 1.37 | 114 | 110 |
| 3 | 15.2 | 51 | 421 | 1.15 | 106 | 98 |
| 4 | 13.4 | 85 | 385 | 1.26 | 122 | 114 |
| 5 | 14.6 | 145 | 415 | 1.38 | 119 | 114 |

Blends 1, 2, 3 and 5, surprisingly, are completely transparent and retain transparency even after annealing at elevated temperatures. Blend 4 is completely opaque indicating incompatibility of the copolyamide with nylon 612.

Solvent Resistance

Resistance to the effect of organic solvents of the copolyamides can be increased by incorporating amounts of crystalline polyamides. Resistance to solvents is measured by use of a quarter elliptical mandrel with a minor and major semi-axis of 1.8 inch and 8 inch respectively.

A sample is clamped on the face of the elliptical jig and immersed in the test solvent. Based on the location of stress cracks on the major axis, the minimum strain (or stress) for failure in that particular solvent can be calculated. Since the blends have relatively comparable modulus, it is sufficient to rank them based on the minimum strain for failure. Higher percent strain at failure indicates greater resistance. Results from this test are summarized in Table 2.

TABLE 2

| Composition | Solvent Resistance (Percent Strain) MeOH | Toluene | $CH_2Cl_2$ |
|---|---|---|---|
| Control-Copolyamide I (Preparation A) IV 0.93 | 0.7, 0.7 | 2.0, 1.8 | 0.8, 0.7 |
| Blend 1 | 15.4 | 4.9, 4.9 | 0.5, 0.5 |
| Blend 2 | 15.4 | 4.9, 4.9 | 0.5, 0.6 |

The Table shows much greater solvent resistance to MeOH and toluene in Blends 1 and 2 over the Control.

Flexural Strength

Flexural strength in alcohols was tested on an Instron tester that had been modified to allow measurement of flex strength of samples while immersed in the solvent. Results are shown in Table 3.

TABLE 3

| Composition | Methanol Kpsi |
|---|---|
| Control-Copolymer I (Preparation A), IV 0.93 | at 23.0, sample broke |
| Blend 1 | at 23.0, sample did not break |
| Control-Copolymer II | at 24.0, sample broke |
| Blend 2 | at 24.0, sample did not break |
| Control-Copolymer III | at 24.0, sample broke |
| Blend 5 | at 24.0, sample did not break |

Table 3 shows that Blends 1, 2 and 5 exhibit better flex strength in methanol than the corresponding controls. Whereas the copolyamide specimens broke during test, the blends did not break.

Zinc Chloride Resistance

The following blends of this invention were prepared. The nylon 66 had a relative viscosity of about 52. Copolyamide I was prepared as in Preparation A except that 38 ml of acetic acid was added and the cresol antioxidant was not used.

Blend 6

80 percent nylon 66
20 percent copolyamide I, IV 0.96

Blend 7

55 percent nylon 66
45 percent copolyamide I, IV 0.96

Zinc chloride resistance is shown by the following Table 4.

TABLE 4

|  |  | 66 Nylon | Copolyamide I | Blend 6 | Blend 7 |
|---|---|---|---|---|---|
| Tensile Strength Kpsi | DAM | 12 | 14 | 13.4 | 14.1 |
|  | 50% RH | 11.2 | — | 9.5 | 11.2 |
| Elongation % | DAM | 60 | 49 | 6 | 5 to 250 |
|  | 50% RH | 300 | — | 175 | 87 |
| Flex Mod Kpsi | DAM | 410 | 403 | 454 | 434 |
|  | 50% RH | 175 | 508 | 382 | 437 |
| Notched Izod ft-lb/in | DAM | 1.0 | 1.6 | 0.9 | 0.96 |
| Mold Shrinkage ⅛" (mils/in) |  | 12 | — | 8 | 3 |
| Zinc Chloride Resistance ⅛" specimen 1" mandrel |  | <3 min | >30 days | <1 hr (1 bar) >30 days (4 bars) | >30 days |

Very surprisingly, Blends 6 and 7 show excellent retention of flexural modulus at 50% RH compared to nylon 66. The improvement is greater than what would be expected on the basis of the amount of copolyamide present. The same is true with the zinc chloride resistance of Blends 6 and 7 as compared to nylon 66.

Effect of Glass Reinforcement

The following blends of this invention were prepared

Blend 8

54 percent 66 nylon
13 percent copolyamide I (Preparation B), IV 0.73
33 percent glass fiber, diameter 0.00035 inch,
length 3/16 inch.

Blend 9

41 percent 66 nylon
26 percent copolyamide I (Preparation B), IV 0.73
33 percent glass fiber used in Blend 8

Results of tests on these blends are shown in Table 5.

TABLE 5

|  | Control A 67 percent 66 nylon 33 percent glass | Blend 8 | Blend 9 |
|---|---|---|---|
| Tensile Strength (Kpsi) |  |  |  |
| DAM | 27.1 | 26.5 | 27.8 |
| 50 percent RH | 20.5 | 23.1 | 20.9 |
| Elongation, percent |  |  |  |
| DAM | 3.8 | 3.2 | 2.9 |
| 50 percent RH | 7.0 | 5.0 | 4.0 |
| Flex. Mod. (Kpsi) |  |  |  |
| DAM | 1348 | 1268 | 1357 |
| 50 percent RH | 967 | 1145 | 1366 |
| Notched Izod (ft-lbs/in) |  |  |  |
| DAM | 2.05 | 1.82 | 2.03 |
| 50 percent RH | 2.17 | 1.53 | 1.59 |
| Mold Shrinkage (mils/in ⅛" specimen) | 0.002 | 0.001 | 0.001 |
| Heat Distortion Temp. °C. |  |  |  |
| 66 psi | 263 | 256 | 250 |
| 264 psi | 253 | 243 | 228 |

The surprisingly high retention of flexural modulus under wet environment is again demonstrated in Table 5. Blends 8 and 9 have much better retention of flex modulus at 50 percent RH than Control A.

We claim:

1. A thermoplastic molding resin comprising
   (a) about 5 to 98 percent by weight of at least one thermoplastic semicrystalline polyamide of film-forming molecular weight, and complementally,
   (b) about 95 to 2 percent by weight of at least one thermoplastic amorphous copolyamide consisting essentially of
      (i) 40–98 mole percent units of isophthalic acid based on total acids present,
      (ii) 2–60 mole percent units of terephthalic acid based on total acids present,
      (iii) 50–98 mole percent units of hexamethylene diamine based on total amines present; and
      (iv) 2–50 mole percent units of bis(p-aminocyclohexyl)methane, based on total amines present wherein in the amorphous copolyamide the mole percent phthalic acids present totals 100 percent and the mole percent diamines present totals 100 percent, and wherein up to 40 percent of the amorphous copolyamide may consist of units of a lactam, or an ω-aminoacid of 4–12 carbon atoms, or units derived from a 4–12 carbon atom aliphatic dicarboxylic acid and a 2–12 carbon atom aliphatic diamine.

2. A blend described as in claim 1 in which the amount of semicrystalline polyamide present is between about 5 and 40 percent by weight and the amorphous copolyamide is complementally present in an amount of between about 95 and 60 percent by weight.

3. A blend described as in claim 1 in which the amount of semicrystalline polyamide present is between about 40 and 98 percent by weight and the amorphous copolyamide is complementally present in an amount of between about 60 and 2 percent by weight.

4. A blend of claim 1, 2 or 3 wherein the thermoplastic amorphous copolyamide consists essentially of
   (i) 40–98 mole percent units of isophthalic acid based on total acids present,
   (ii) 2–60 mole percent units of terephthalic acid based on total acids present,
   (iii) 50–98 mole percent units of hexamethylene diamine based on total amines present; and (iv) 2–50 mole percent units of bis(p-aminocyclohexyl)methane, based on total amines present wherein the mole percent phthalic acids present totals 100 percent and the mole percent diamines present totals 100 percent.

5. A blend of claim 1, 2 or 3 wherein the thermoplastic amorphous copolyamide consists essentially of
 (i) 60–80 mole percent isophthalic acid
 (ii) 20–40 mole percent terephthalic acid
 (iii) 94–98 mole percent hexamethylenediamine
 (iv) 2–6 mole percent bis(p-aminocyclohexyl)methane wherein the mole percent phthalic acids present totals 100 percent and the mole percent diamines present totals 100 percent.

6. A blend of claim 1, 2 or 3 which additionally contains a reinforcing agent.

7. A blend of claim 6 wherein the reinforcing agent is glass fiber.

8. A blend of claim 4 which additionally contains a reinforcing agent.

9. A blend of claim 8 in which the reinforcing agent is glass fiber.

10. A blend of claim 5 which additionally contains a reinforcing agent.

11. A blend of claim 10 in which the reinforcing agent is glass fiber.

12. An article molded from the blend of claim 1, 2 or 3.

13. An article molded from the blend of claim 4.

14. An article molded from the blend of claim 5.

* * * * *